US012627527B2

(12) United States Patent
Prakash et al.

(10) Patent No.: US 12,627,527 B2
(45) Date of Patent: May 12, 2026

(54) APPLICATION AWARE MODBUS GATEWAY

(71) Applicant: Honeywell International Inc.,
Charlotte, NC (US)

(72) Inventors: Suraj Prakash, Bengaluru (IN);
Mohammed Rizwan, Bengaluru (IN)

(73) Assignee: Honeywell International Inc.,
Charlotte, NC (US)

( * ) Notice: Subject to any disclaimer, the term of this
patent is extended or adjusted under 35
U.S.C. 154(b) by 0 days.

(21) Appl. No.: 18/376,546

(22) Filed: Oct. 4, 2023

(65) Prior Publication Data

US 2025/0119319 A1     Apr. 10, 2025

(51) Int. Cl.
*H04L 12/66*     (2006.01)
*H04L 67/00*     (2022.01)
*H04L 67/12*     (2022.01)

(52) U.S. Cl.
CPC .............. *H04L 12/66* (2013.01); *H04L 67/34*
(2013.01); *H04L 67/12* (2013.01)

(58) Field of Classification Search
CPC ......... H04L 12/66; H04L 67/34; H04L 67/12;
H04L 12/12; H04L 67/55; G05B 19/4185
See application file for complete search history.

(56) References Cited

U.S. PATENT DOCUMENTS

| | | |
|---|---|---|
| 10,272,381 B2 | 4/2019 | Saukaitis et al. |
| 10,382,395 B2 | 8/2019 | De Ligt |
| 10,637,783 B2 | 4/2020 | Krishna Singuru |
| 11,435,726 B2 | 9/2022 | Sayyarrodsari et al. |
| 11,632,417 B2 | 4/2023 | Kao et al. |
| 2015/0281319 A1* | 10/2015 | Maturana ........... G05B 19/4185 |
| | | 709/202 |
| 2018/0026942 A1* | 1/2018 | De Ligt .................. H04L 61/35 |
| | | 709/245 |
| 2018/0059921 A1* | 3/2018 | De Ligt ............... G05B 19/409 |
| 2020/0145494 A1* | 5/2020 | Buchstaller ............. H04L 67/10 |
| 2021/0092173 A1* | 3/2021 | Nixon ................ G05B 19/4185 |
| 2022/0078267 A1* | 3/2022 | Nixon ................ G05B 19/0423 |

FOREIGN PATENT DOCUMENTS

CN          111541579 B      10/2020

* cited by examiner

*Primary Examiner* — Caroline H Jahnige
(74) *Attorney, Agent, or Firm* — Paschall & Associates,
LLC; James C. Paschall; Anthony Miologos

(57)          ABSTRACT

A Modbus gateway includes a processor, an application
memory, and a data acquisition module for receiving field
data from an industrial process run in a plant including
processing equipment having associated field devices. The
data acquisition module is coupled to provide the field data
to a data broker having at least one memory that stores the
field data according to data registers associated with the field
devices. The data broker is coupled to the application
memory containing at least one data map organized accord-
ing to an application context requested by a subscribed client
device for an application executing at the client device. The
data broker is coupled to associate the data registers into a
grouping of field data according to the data map, wherein the
processor causes the grouping of field data to be sent to the
client device subscribed to the data map.

12 Claims, 5 Drawing Sheets

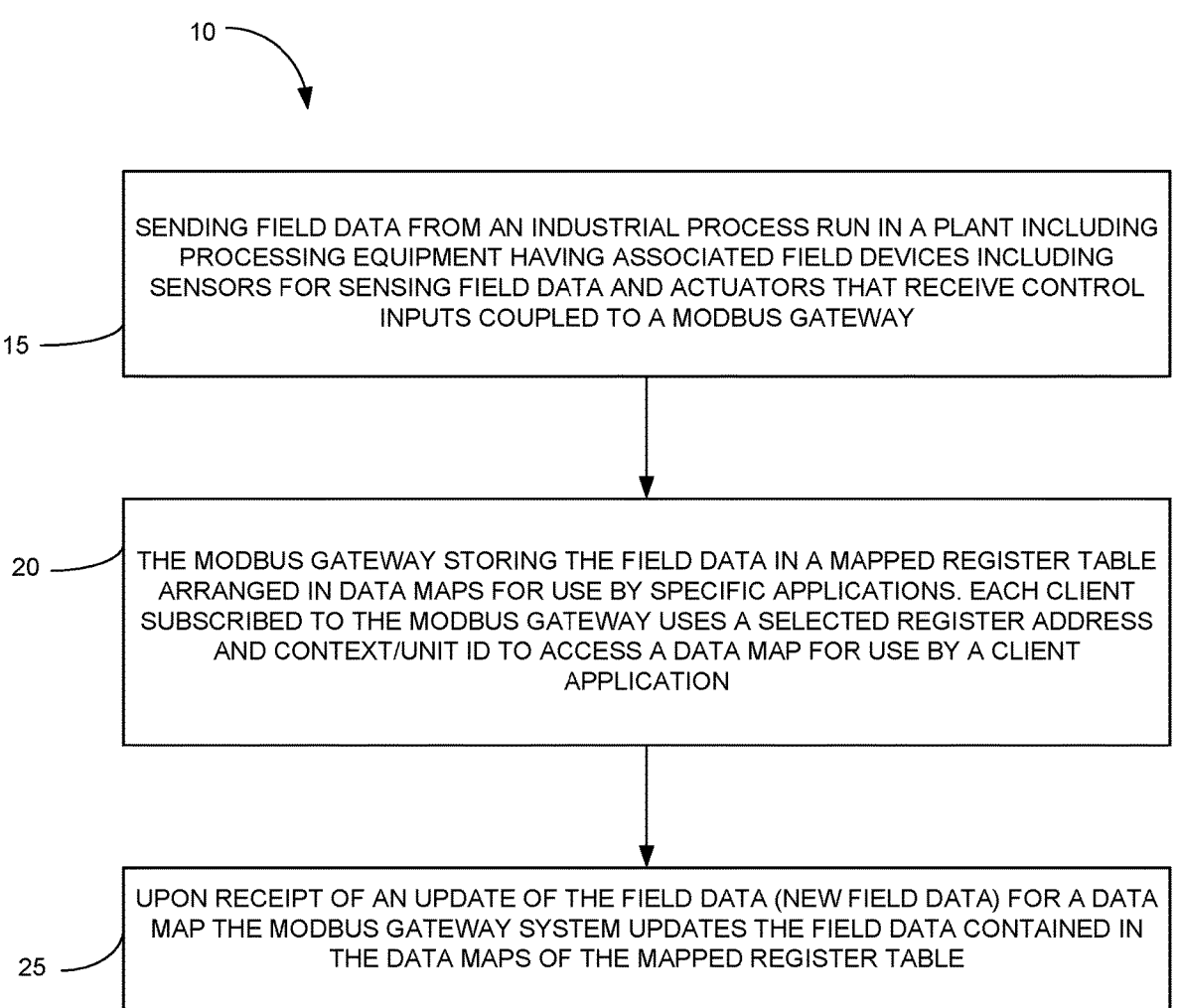

SENDING FIELD DATA FROM AN INDUSTRIAL PROCESS RUN IN A PLANT INCLUDING PROCESSING EQUIPMENT HAVING ASSOCIATED FIELD DEVICES INCLUDING SENSORS FOR SENSING FIELD DATA AND ACTUATORS THAT RECEIVE CONTROL INPUTS COUPLED TO A MODBUS GATEWAY

15

THE MODBUS GATEWAY STORING THE FIELD DATA IN A MAPPED REGISTER TABLE ARRANGED IN DATA MAPS FOR USE BY SPECIFIC APPLICATIONS. EACH CLIENT SUBSCRIBED TO THE MODBUS GATEWAY USES A SELECTED REGISTER ADDRESS AND CONTEXT/UNIT ID TO ACCESS A DATA MAP FOR USE BY A CLIENT APPLICATION

20

UPON RECEIPT OF AN UPDATE OF THE FIELD DATA (NEW FIELD DATA) FOR A DATA MAP THE MODBUS GATEWAY SYSTEM UPDATES THE FIELD DATA CONTAINED IN THE DATA MAPS OF THE MAPPED REGISTER TABLE

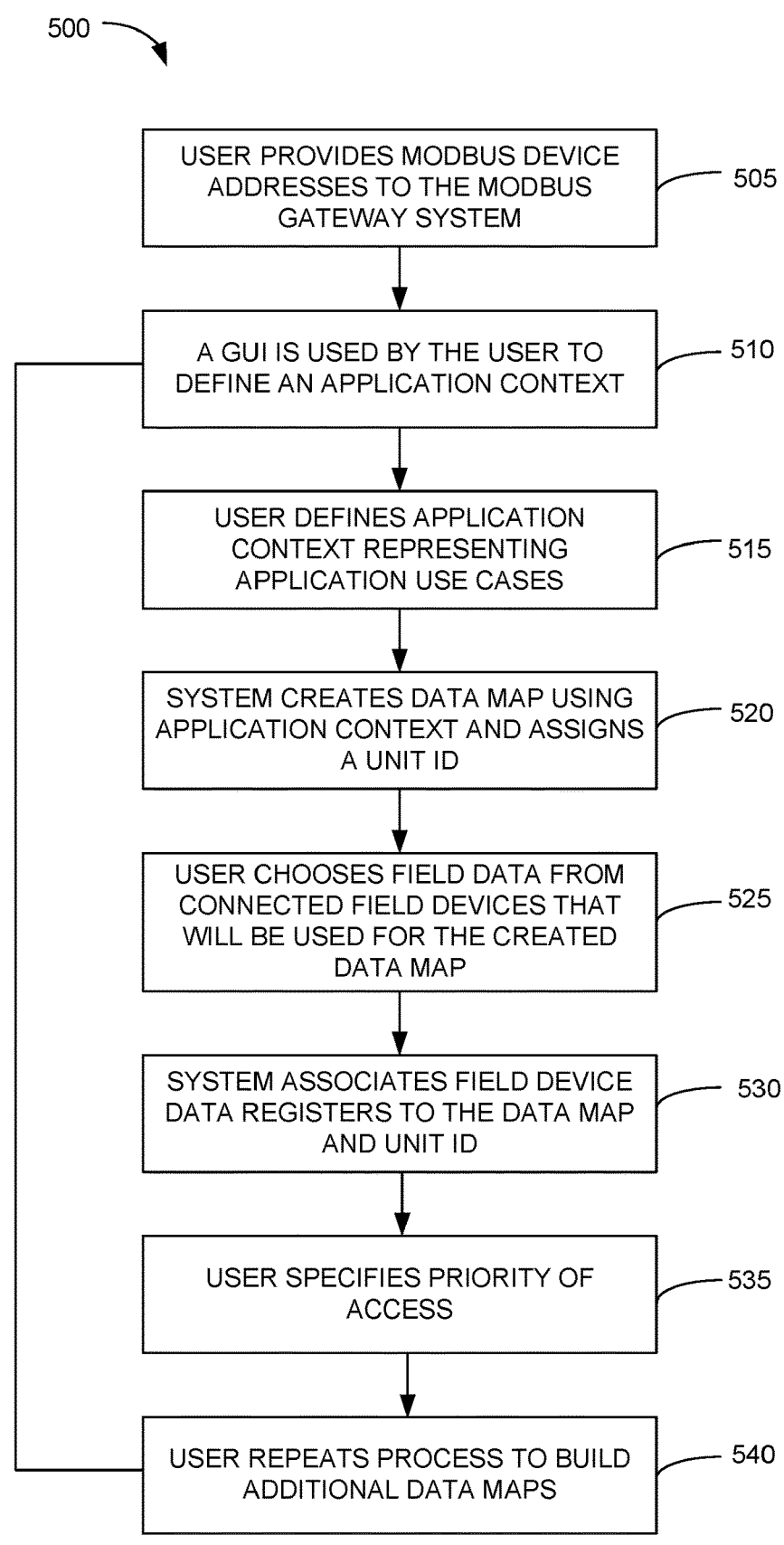

500

USER PROVIDES MODBUS DEVICE ADDRESSES TO THE MODBUS GATEWAY SYSTEM — 505

A GUI IS USED BY THE USER TO DEFINE AN APPLICATION CONTEXT — 510

USER DEFINES APPLICATION CONTEXT REPRESENTING APPLICATION USE CASES — 515

SYSTEM CREATES DATA MAP USING APPLICATION CONTEXT AND ASSIGNS A UNIT ID — 520

USER CHOOSES FIELD DATA FROM CONNECTED FIELD DEVICES THAT WILL BE USED FOR THE CREATED DATA MAP — 525

SYSTEM ASSOCIATES FIELD DEVICE DATA REGISTERS TO THE DATA MAP AND UNIT ID — 530

USER SPECIFIES PRIORITY OF ACCESS — 535

USER REPEATS PROCESS TO BUILD ADDITIONAL DATA MAPS — 540

FIG. 5

APPLICATION AWARE MODBUS GATEWAY

TECHNICAL FIELD

This disclosure is generally directed to the field of industrial networks. More specifically, it relates to an application aware gateway device operating under a Modbus protocol.

BACKGROUND

Process control systems, like those used in chemical, petroleum, or other processes, typically include at least one centralized process controller communicatively coupled to at least one host or operator workstation and to one or more field devices via analog and/or digital buses or other communication lines or channels. The field devices, which may be, for example, valves, valve positioners, switches, transmitters (e.g., temperature, pressure, and flow rate sensors), etc., perform functions within the process such as opening or closing valves and measuring process parameters.

The process controller receives signals indicative of process measurements made by the field devices and/or other information pertaining to the field devices via an input/output (I/O) device, uses this information to implement a control routine, and then generates control signals which are sent over the buses or other communication channels via the input/output device to the field devices to control the operation of the process. Information from the field devices and the controller is typically made available to one or more applications executed by the operator workstation to enable an operator to perform any desired function with respect to the process, such as viewing the current state of the process, modifying the operation of the process, configuring the process, documenting the process, etc.

In the past, standard communication protocols were developed to enable controllers and field devices from different manufacturers to exchange data using standard formats. The Modbus protocol can define a message structure that controllers will recognize and use regardless of the types of networks over which they communicate. The Modbus protocol establishes a common format for the layout and content of message fields. Modbus defines a process for controllers to request access to other devices, for the controllers and devices to respond to requests, and for error detection and reporting. During communications on a Modbus network, the protocol determines how each controller or device will know its device address, recognize a message addressed to it, determine the kind of action to be taken, and extract any data or other information contained in the message. If a reply is required, the controller or device will construct the reply message and send it using the Modbus protocol. The Modbus protocol is known in the art and is described in detail in numerous articles, brochures and specifications published, distributed and available from, among others, manufacturers of devices using the Modbus protocol. As a result, the details of the Modbus communication protocol will not be described in detail except to the extent they relate to the disclosed embodiments.

Modbus employs a master-slave query-response cycle for exchanging information between controllers and field devices. Each device can be assigned an address ranging between, for example, 1 and 255. One device (i.e., the "master") can initiate transactions, such as queries, set point changes, diagnostics, and the like by transmitting a message addressed to another device (i.e., the "slave"). Under the Modbus protocol, the message transmitted by the master device is formatted to include the device address of the slave device, a function code defining the requested action, any data to be sent to the slave device, and error-checking information. The slave device detects and receives the message from the master based on the address in the message, and processes the transaction or function indicated by the function code in the message. After processing the transaction or performing the requested function, the slave transmits a response message constructed using the Modbus protocol and containing information confirming the action taken, any data to be returned to the master, and error-checking information.

The response message transmitted by the slave device will typically include a register map where configuration, input and output data can be written and read from. The Modbus data model includes four basic map tables organized into a flat table structure consisting of Discrete Inputs, Coils Outputs, Input Registers and Holding Registers. Data is Organized based on data types and access types, i.e., holding, discrete etc.). The Discrete Input map table allows random access to Digital/Boolean Inputs. The Coils Outputs map table is used for read/write access to Digital/Boolean output data. The Input Register map table is used for read only access to Analog/16 Bit Integers and the holding register map table is used for read/write access to Analog/16 Bit Integer output data.

The Modbus flat table model discussed above is typically sufficient to provide a master-slave query-response cycle for exchanging information between single controllers and assigned field devices. However, in certain Modbus configurations a Modbus data concentrator is used to function as a Modbus master to multiple Modbus slave devices. A Modbus concentrator connects to several slave devices simultaneously and provides access to data from all slave devices. However, as the flat data tables become larger due to the larger number of slave devices it becomes difficult to organize the four basic map tables to associate any meaning or context to the data received from the slave devices.

Different applications may need to access different data sets based on particular use cases from one or more field devices. For example, for controlling a skid, data from all elements of the skid such as control data from a programmable logic controller (PLC) or Input/Output (I/O) modules, etc. may be required to be accessed. Certain applications need to access data at different priority levels. For example, a control application will be interested in the critical inputs and outputs of a system. However, a diagnostic/display application will require to access more data items but at a slower rate for display/monitoring purposes.

The present Modbus data model does not provide a way to group data or to manage and monitor storage at the level that may be required by individual applications to manage field devices. Therefore, the present disclosure defines an application aware gateway device that uses the Modbus protocol.

SUMMARY

This Summary is provided to introduce a brief selection of disclosed concepts in a simplified form that are further described below in the Detailed Description including the drawings provided. This Summary is not intended to limit the claimed subject matter's scope.

A first disclosed embodiment includes a method for exchanging process data between processing equipment of an industrial process and at least one application executing at a client device. The method comprises sending process data from the processing equipment of the industrial process to a gateway device. Sending a request to the gateway device for process data relating to an application context and creating a data map in at least one memory of the gateway device for the application context and assigning a unit ID to the data map. The method associates the process data sent to the gateway device from the processing equipment with the data map to create a grouping of process data for the application context, wherein the client device subscribes to the gateway device using the unit ID to receive the grouping of process data.

A second disclosed embodiment includes a gateway device that includes a processor, an application memory, and a data acquisition module for receiving field data from an industrial process run in a plant including processing equipment having associated field devices. The data acquisition module is coupled to provide the field data to a data broker having at least one memory that stores the field data according to data registers associated with the field devices. The data broker is coupled to the application memory containing at least one data map organized according to an application context requested by a subscribed client device for an application executing at the client device. The data broker is coupled to associate the data registers into a grouping of field data according to the data map, wherein the processor causes the grouping of field data to be sent to the client device subscribed to the data map.

A third disclosed embodiment includes a computer program product comprising a non-transitory data storage medium that includes program instructions executable by a processor to enable the processor to execute a method of exchanging process data between processing equipment of an industrial process and at least one application executing at a client device the method comprising sending field data from the processing equipment from field devices associated with the industrial process to a gateway device. Defining an application context representing application use cases executing at the client device and creating a data map in at least one memory of the gateway device for the application context and assigning a unit ID to the data map. Selecting field data sent to the gateway device to associate with the data map to create a grouping of field data for the application context, wherein the client device subscribes to the gateway device using the unit ID to receive the grouping of field data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 1 is a flow chart that shows the steps in a method for exchanging data between field devices and clients using an application aware Modbus gateway according to an example embodiment;

FIG. 5 is a flow chart that illustrates a method for creating application aware grouping of data using the system of the Modbus gateway according to an example embodiment.

DETAILED DESCRIPTION

Figure 2:
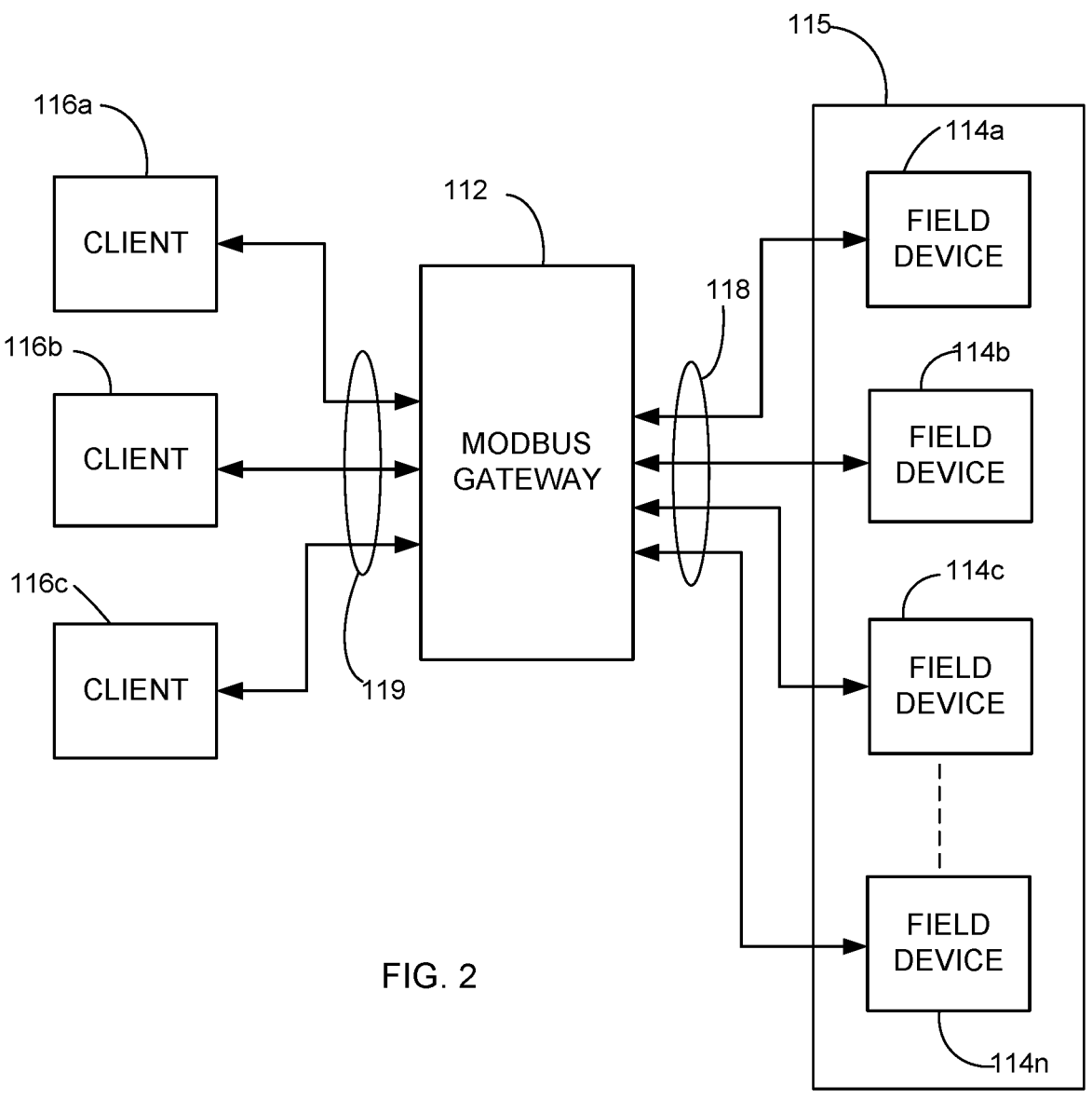
FIG. 2 is a schematic diagram illustrating the communication organization of field devices and clients to the Modbus gateway according to an example embodiment.

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitic in the pathway, or through an indirect electrical connection via intervening items including other devices and connections. For indirect coupling, the intervening item generally does not modify the information of a signal but may adjust its current level, voltage level, and/or power level.

As indicated previously, thousands of legacy industrial communications devices (e.g., Modbus field devices) such as actuators, industrial power measuring meters, process measuring transmitters, and other process measuring devices exist in industrial plants, and there is a need to facilitate communications between such devices and the control rooms and other systems and devices.

Note that the term "Modbus" as utilized herein relates to a serial communications protocol published by Modicon (now Schneider Electric) in 1979 for use with programmable logic controllers. Simple and robust, it has since become a de facto standard communication protocol and is now a commonly available means of connecting industrial electronic devices. The main reasons for the use of Modbus in an industrial environment is that it was developed with industrial applications in mind, is easy to deploy and maintain, and can move raw bits or words without placing many restrictions on venders. Modbus enables communication among many devices connected to the same network, for example, a system that measures temperature and humidity and communicates the results to a computer. Modbus is often used to connect a supervisory computer with an RTU in SCADA (Supervisory Control and Data Acquisition) systems.

Note that although the example embodiments disclosed herein discuss various Modbus devices and systems, it should be understood that the disclosed embodiments are not limited to the use of the Modbus communications protocol and that other serial communication protocols may be considered. For exemplary purposes, however, Modbus is discussed herein as an example of a serial communications protocol found in many legacy devices in industrial applications.

The disclosed embodiments can assist customers and other users to permit any device (e.g., Modbus enabled devices) to group data from field devices of an industrial plant for use by applications executing at client devices of for example, a control room of the industrial plant.

FIG. 1 is a flow chart that shows steps in a method 10 of exchanging data between field devices and clients using an application aware Modbus gateway according to an example embodiment. Step 15 comprises sending field data from an industrial process run in a plant (see industrial plant 115 in FIG. 2) including processing equipment having associated field devices 114a, 114b, 114c-114n. As illustrated in the schematic diagram of FIG. 2, the field devices 114a-114n may be comprised of sensor(s) and actuator(s) (collectively field devices 114) operating using a serial Modbus communication protocol. The field data is uplinked using a communication network 118 to a Modbus gateway 112, that acts as a concentrator for processing the fields data from field devices 114 for transmission of the field data to clients 116a, 116b and 116c (collectively clients 116) along a second communication network 119.

The Modbus gateway 112 shown in FIG. 2, is connected to field devices 114 and to Modbus clients 116. The field devices 114 and clients 116 may be coupled to the Modbus gateway 112 using a serial communication protocol or a Modbus TCP/IP communication protocol that communicates the Modbus protocol over an Ethernet IP network. The field devices 114 may also comprise Modbus TCP serial converters that convert serial data streams to the Modbus TCP/IP protocol. The Modbus gateway 112 is arranged to periodically poll the field devices 114 for data based on preconfigured data registers defined by the Modbus clients 116. The Modbus gateway 112 scans and polls field devices 114, with an acquisition module, such as for example a scanner. The scanner makes sure that the field data gets acquired regularly. A side task of the scanner is to raise events when the field devices 114 are not responding for some reason. However, the field data can flow to the Modbus gateway 112 in other ways. In another embodiment, instead of scanning the measured field data to scanned data, the field devices 114 can be "smart" field devices programmed to deliver the field data regularly (at regular or predetermined intervals) to the gateway 112.

In step 20 of method 10, the field data from the field devices 114 is coupled to the Modbus gateway 112 using communication network 118. Communication network 118 may be comprised of an Ethernet IP bus or a serial bus that uses a Modbus remote terminal unit (RTU), using a serial communication protocol. The field data from field devices 114 is cached in the Modbus gateway 112 and mapped to a Modbus register map table. The field data in the mapped register table is grouped into data tables based on a specific context required by an application executing at a client 116. Each client 116 can subscribe to the Modbus gateway 112 using the unit ID of the data table to access the grouped field data from contained in the data map for use by the application.

Figure 3:
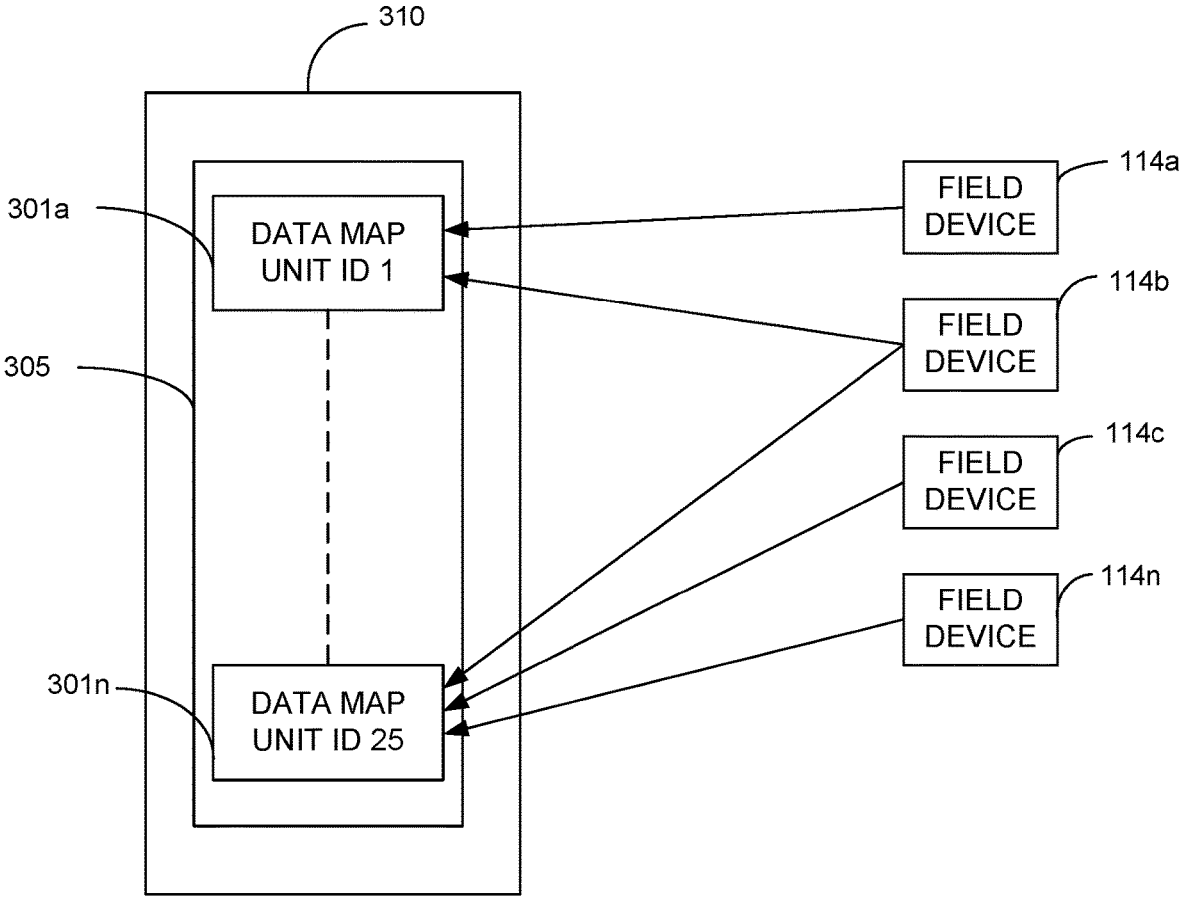
FIG. 3 a diagram of the data groupings of the Modbus mapped register table of Modbus gateway according to an example embodiment.

FIG. 3 illustrates a diagram of the data groupings of the Modbus mapped register table 305 contained in a memory 310 of Modbus gateway 112. The mapped register table 305 includes multiple data maps 301a, 301n based on client application contexts. Field data from field devices 114a and 114b are gathered from the field device registers and stored in a data map 301a-301n according to an application context. For example, the application context for map 301a may contain field data relevant for use by a control or diagnostic application of a client 116. The client 116 would subscribe to the Modbus gateway 112 to receive the data from data map 301a for use by the control or diagnostic application. The Modbus mapped register table 305 may further include at least a second data map 301n organized for another application context containing field data from field devices 114b-114n. The data map 301n is organized to provide field data for an application context of another client 116. For example, the field data from data map 301n may be used by an application executing on a client 116 using a display device in a control room of the industrial plant. The data map 301n is created to deliver process data information, e.g., pressures, temperatures, and equipment status for display on the display device. Data map 301n is contextually configured to collect field data from field devices 114c-114n important in the monitoring of the process plant or a process controlled by the plant.

The registers of field devices 114a-114n may be set up by a user to be associated with one or more of data maps 301a-301n, based on user defined contexts for the client 116 application coupled to Modbus gateway 112. Each individual data map 301a-301n includes a unit ID that provides an identification to a unique data map. For example, a client 116 requesting data from data map 301a would use a Modbus address containing a unit ID of 1. Another client 116 requesting data from data map 301n would use a Modbus address containing a unit ID of 25.

As shown in step 25 of FIG. 1, the field data contained in each data map 301a-301n would be updated with any new or updated field data from its associated field device 114a-114e.

Figure 4:
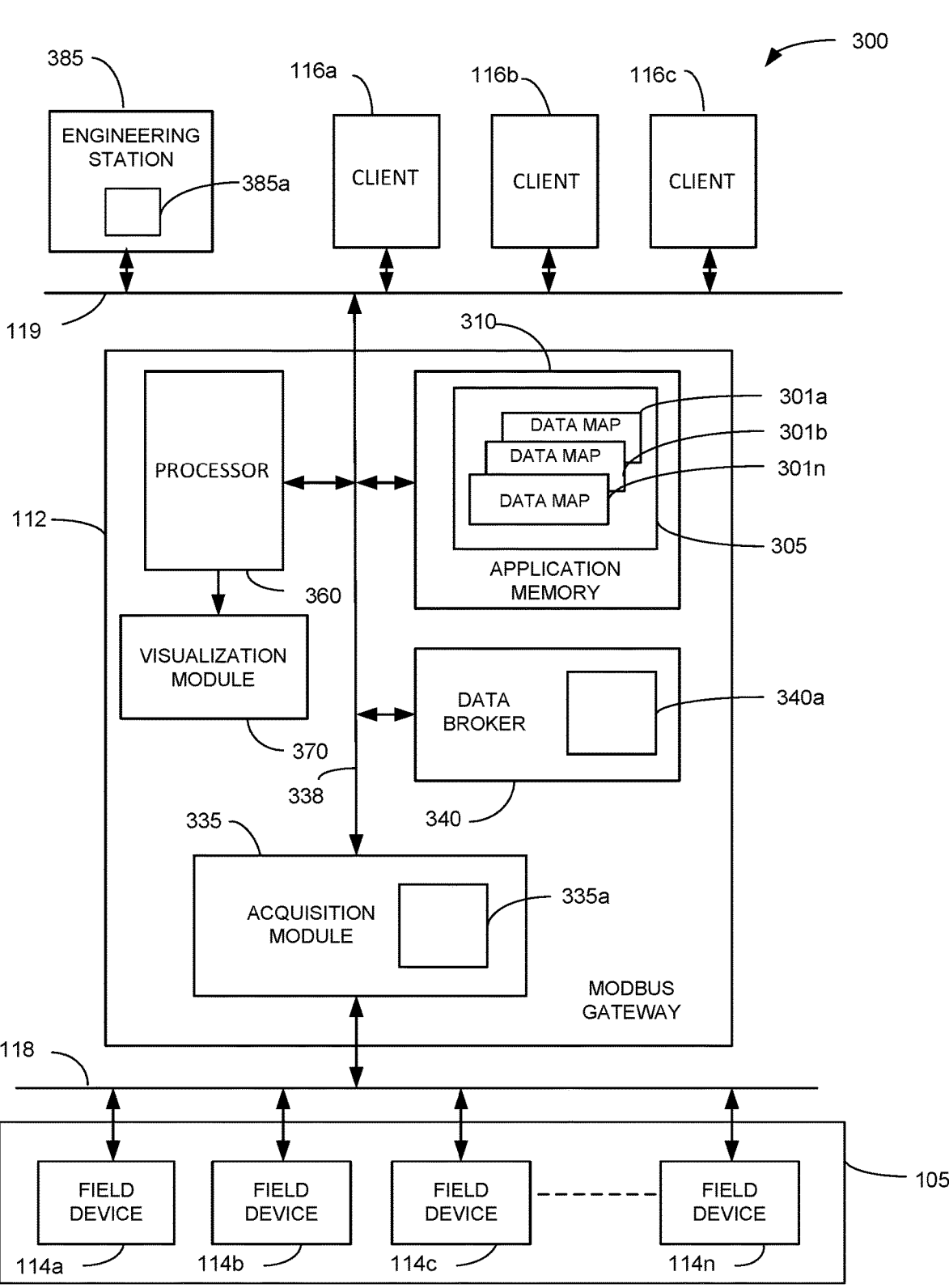
FIG. 4 is a depiction of a system configured to create application aware groupings of field data in the Modbus gateway according to an example embodiment.

FIG. 4 is a depiction of a system 300 associated with an industrial plant 105 configured to create an application aware grouping of field data in the Modbus gateway 112 according to an example embodiment. The embodiment of the system 300 illustrated by the block diagram shown in FIG. 4 is for illustration only. Other embodiments can be used without departing from the scope of the present disclosure.

The Modbus gateway 112 includes a data acquisition module 335 which functions as an input/output (I/O) module. The data acquisition module 335 can comprise a smart Communication Interface Unit (CIU) which can provide an intelligent I/O interface that knows about the field devices or processing equipment (e.g., instruments, tanks) installed at the industrial plant 105. Such a CIU can take care of fetching the field data from the field devices 114a-114n, performing data calculations, and presenting the data from the field devices to the other modules of the Modbus gateway 112, such as the data broker 340, processor 360, visualization module 370 and application memory 310.

The field devices 114a-114n in industrial plant 105 provide measured field data. The field devices 114a-114n may also include actuators that are coupled to processing equipment such as, for example, storage tanks and valves used in refining or distillation system configured control an industrial process. The field devices 114a-114n are coupled by a bus 118 to the data acquisition module 335. The bus 118 can be a serial bus, such as a MODBUS RTU, used in serial communication which makes use of a compact, binary representation of the data for protocol communication.

Process data from the plant 105 acquired by data acquisition module 335 is stored in a cache memory 335a of data acquisition module 335. The data broker 340 scans this cache memory 335a (e.g., Random Access Memory) on regular basis to collect new field data. This means two asynchronous communication routines work with the same cache memory 335a. The data acquisition module 335 is polling the field data from the field devices 114a-114n and is storing data in the cache memory 335a while the data broker 340 is polling the same cache memory 335 for updates. The field data from the acquisition module 335 cache memory 335a is coupled to the data broker memory 340a (e.g., Random Access Memory) that stores the field data according to data registers of the connected field devices.

The processor 360 may comprise a microprocessor, digital signal processor (DSP), or microcontroller unit (MCU). The processor 360 is communicatively coupled to an internal communication network 338 for receiving field data from the data broker 340 that executes an operating program for managing system 300. The processor 360 is further communicatively coupled to application memory 310 that stores the mapped register table 305 and associated data maps 301a-301n developed for the client applications. The visualization module 370 is used by system 300 as an interface to a graphic user interface (GUI) 385a executing at an operator's station, serving as an engineering station 385 for system 300. The visualization module 370 may include visualization protocols for operating with the GUI 385a for the display of parameters available from the field devices according to data fields, such as for example, temperature, pressure, flow, commissioning and configuration, diagnostics, alarms etc. The visualization protocols may also be accessed to operate within a browser on a PC functioning as an engineering station. The visualization module 370 may also be arranged to provide visualization protocols to GUIs operating on a mobile device or mobile applications running on smart phones or tablets for a display. The visualization module 370 may also support the GUI 385a to perform a number of functions, for example extracting the information, taking care of the rounding and format in a number of decimals, and showing the right units of dimension. On request values need to be converted to another dimension and shown with another number of decimals. Colors can be provided having special meanings, and the status generally needs to be determined and shown.

The processor 360 with input from the user via the engineering station 385 defines data maps to the field data contained in data registers developed for a specific client application context data grouping. The processor 360 builds the data map and assigns a unique user ID to the data map that identifies it. The defined data maps 301a-301n are stored in the application memory 310 within the mapped register table 305. The individual data maps 301a-301n stored in the application memory 305 are subscribed to by clients 116a-116c by a specific unit ID and arranged to be pushed to communication network 119 from application memory 310 for use by a clients 116a-116c and their associated applications. Communication network 119 can be a serial bus, such as a MODBUS RTU, or a MODBUS TCP/IP that uses TCP/IP protocols to couple Ethernet enabled devices over an Ethernet network using MODBUS messaging.

FIG. 5 is a flow chart that illustrates a method 500 for creating application aware grouping of data using system 300 of Modbus gateway 112 according to an example embodiment.

In step 505 a user, such as for example a plant operator using engineering station 385 enters list of the Modbus device addresses of the field devices 114a-114n that are to be used to define an application context for a client device. For example, client 116a in FIG. 4.

In step 510 the engineering station 385 receives the request from the user and presents to the user via the GUI 385a lists and selection menus to define an application context.

In step 515 the user using the lists and selection menus presented by the GUI 385a defines the application context representing the application use case for the client application. For example, the user would define an application context representing use cases, for control, diagnostic, display, process area, etc.

In step 520 the processor 360 receives the use case for the client application downlinked from engineering station 385 via communication network 119. The processor 360 creates a data map 301 in the mapped data register 305 of application memory 310 for the user selected use case and assigns a unit ID to the data map.

Next in step 525, the data registers contained in the data broker memory 340a for the field device addresses identified in step 505 are selected by the user using the GUI 385a at the engineering station 385. The identified field device addresses are transmitted to the processor 360 to associate the field device registers to the data map. The data broker memory 340a contains field data from the data registers of the field devices connected to the Modbus gateway 112.

Next in step 530, the data registers contained in memory 340a of data broker 340 are associated to the data map 301 and the unit ID, thereby developing a grouping of field data contained in the data registers for the application context. As was explained in FIG. 3, the selected field data may come from the data register of a single field device 114a-114n or the data registers of one more field device 114a-114n.

Next in step 535 the user specifies a specific priority of access for the data map, based on the importance of the client application to the plant 150. For example, an application monitoring a safety system would have higher priority of access to the field data than for instance a diagnostic application context.

In step 540 the user can request to build additional context related grouping by repeating steps 510-535 to create another data map 301 for another client application.

As discussed above in FIG. 1, a client device 116a-116c can subscribe to the data map contained in the Modbus gateway 112 using the unique ID coupling the field data from the selected data registers to the application executing at the client device.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for a gateway device to exchange field data between field devices in a plant and at least one application executing at a client device, wherein the field devices and the client device are coupled to the gateway device using a Modbus protocol, wherein the gateway device comprises a processor, a data acquisition module, and a data broker, the method comprising:

receiving, by the processor, an application context representing application use cases executing at the client device;

creating, by the processor, one or more data maps in at least one memory of the gateway device for the application context;

assigning, by the processor, a unit ID to each of the one or more data maps, wherein the client device accesses the one or more data maps using a Modbus address that comprises the unit ID of corresponding one of the one or more data maps;

receiving, by the processor, a priority level to the at least one application for accessing the one or more data maps, wherein the priority level for accessing the one or more data maps is determined based on an importance of the application context of the at least one application to an industrial process; and associating, by the processor, data registers of the field devices with the one or more data maps to create a grouping of the field data from the field devices for the application context, wherein the client device subscribes to the gateway device using the unit ID to receive the grouping of the field data; and transmitting, by the processor, the one or more data maps to the at least one application executing at the client device subscribed to the one or more data maps based on the priority level of the at least one application, comprising:

updating the one or more data maps based on the field data from the data registers associated with the one or more data maps, comprising:

polling, by the data acquisition module, the field devices to receive the field data from the data registers of the field devices based on the priority level, wherein the field data received from the field devices is stored in a cache memory of the data acquisition module, wherein the data broker simultaneously polls the cache memory of the data acquisition module to store the field data in at least one memory of the data broker.

2. The method of claim 1, wherein the gateway device stores the field data according to an address of each of the field devices in a data acquisition memory.

3. The method of claim 2, wherein the gateway device is communicatively coupled to an operator's station executing a graphic user interface (GUI), and wherein the method further comprises sending from gateway device visualization protocols to the GUI for displaying field data parameters from the field devices.

4. The method of the claim 3, wherein the method further comprises receiving, via the GUI, a list of addresses of the field devices to be used in a definition of the application context for the at least one application executing at the client device.

5. The method of claim 3, wherein the method further comprises using the GUI to define the application context representing application use cases for the at least one application executing at the client device.

6. The method of claim 4, wherein the method further comprises receiving, via the GUI, a selection of the field devices to be associated with the one or more data maps, and wherein the list of addresses of the field devices is received by the gateway device.

7. A gateway device comprising;

a processor;

a data broker;

a data acquisition module configured to receive field data from field devices in a plant;

wherein the data acquisition module coupled to the data broker to provide the field data to the data broker having at least one memory that stores the field data according to data registers associated with the field devices;

wherein the data broker is coupled to an application memory containing at least one data map organized according to an application context requested by a subscribed client device for an application executing at the subscribed client device;

wherein the processor is configured to:

receive an application context representing application use cases executing at the subscribed client device;

create the at least one data map in an application memory of the gateway device for the application context; and assign a unit ID to each of the at least one data map, wherein the subscribed client device accesses the at least one data map using a Modbus address that comprises the unit ID of corresponding one of the at least one data map;

receive a priority level to at least one application for accessing the at least one data map, wherein the priority level is determined based on an importance of the application context of the at least one application to an industrial process;

associate the data registers of the data broker with the at least one data map to create a grouping of field data from the field devices for the application context, wherein the subscribed client device subscribes to the gateway device using the unit ID to receive the grouping of the field data; and the processor, based on the priority level of the at least one application, is further configured to:

cause the data acquisition module to poll the field devices to receive the field data from the data registers of the field devices based on the priority level, wherein the field data received from the field devices is stored in a cache memory of the data acquisition module; and causes the data broker to simultaneously poll the cache memory of the data acquisition module to store the field data in the at least one memory of the data broker; and update the at least one data map based on the field data from the data registers associated with the at least one data map, wherein the processor causes the at least one data map to be sent to the at least one application executing at the subscribed client device subscribed to the at least one data map.

8. The gateway device of claim 7, wherein the gateway device is communicatively coupled to an operator's station executing a graphic user interface (GUI) and the gateway device includes a visualization module that sends visualization protocols to the GUI for displaying field data parameters from the field devices.

9. The gateway device of claim 8, wherein the GUI is configured to receive a list of addresses of the field devices to be used in definition of the application context for the application executing at the subscribed client device.

10. The gateway device of claim 9, wherein the application context and use cases are received by the gateway device where the processor creates the at least one data map and stores the at least one data map in the application memory with a unit ID.

11. The gateway device of claim 9, wherein the GUI is further configured to receive selection of the field devices for the at least one data map, and wherein the list of addresses of the field devices is received by the gateway device where the processor associates the data registers to the at least one data map.

12. A computer program product, comprising:

a non-transitory data storage medium that includes program instructions executable by a processor to enable said processor to execute a method of exchanging a field data between field devices in a plant and at least one application executing at a client device, wherein the field devices and the client device are coupled to a gateway device using a Modbus protocol, said method comprising:

defining an application context representing application use cases executing at the client device;

creating one or more data maps in at least one memory of the gateway device for the application context and assigning a unit ID to each of the data maps, wherein the client device accesses the one or more data maps using a Modbus address that comprises the unit ID of corresponding one of the one or more data maps;

receiving a priority level to the at least one application for accessing the one or more data maps, wherein the priority level is determined based on an importance of the application context of the at least one application to an industrial process; and associating data registers of the field devices with the one or more data maps to create a grouping of field data from the field devices for the application context, wherein the client device subscribes to the gateway device using the unit ID to receive the grouping of field data; and transmitting the one or more data maps to the at least one application executing at the client device subscribed to the one or more data maps based on the priority level of the at least one application, comprising:

updating the one or more data maps based on the field data from the data registers associated with the one or more data maps, comprising:

polling the field devices to receive the field data from the data registers of the field devices based on the priority level, wherein the field data received from the field devices is stored in a cache memory of a data acquisition module, wherein a data broker simultaneously polls the cache memory of the data acquisition module to store the field data in at least one memory of the data broker.

* * * * *